July 17, 1951　　　R. A. SHAW　　　2,561,145
MATERIAL DISTRIBUTOR
Filed Aug. 7, 1946
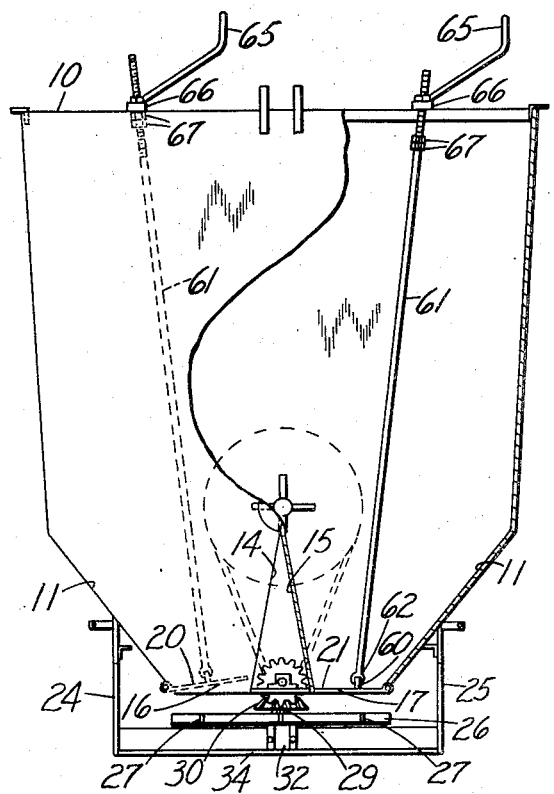
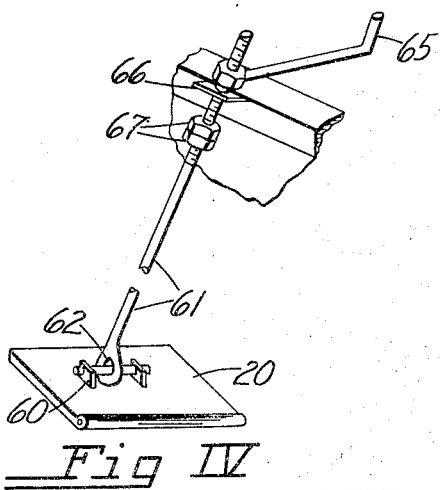
INVENTOR.
Roy A. Shaw
BY Edmund B. Whitcomb
Attorney Patented July 17, 1951

2,561,145

UNITED STATES PATENT OFFICE 2,561,145

MATERIAL DISTRIBUTOR

Roy A. Shaw, San Bernardino, Calif.

Application August 7, 1946, Serial No. 688,814

1 Claim. (Cl. 275—8)

This invention relates to a mechanical distributing means for spreading fertilizer in a special manner and also for sowing cover crops such as oats, barley, rye, etcetera.

The object of the invention is to provide a compact apparatus deriving its power from the power take off of a farm tractor, for example, and is especially useful in citrus groves and does not extend sidewise beyond the tractor and will not break off branches, etcetera, when being used.

Another object is to provide a simplified construction which is rugged and strong, and by providing a double universal joint connection for the drive of the distributing mechanism, I reduce wear due to vibration, uneven action, etcetera. Moreover, the various parts may be readily removed for repair, replacement, etcetera.

Another important object of my invention is to provide an adjustable feed control and shut off mechanism which may be readily operated and set for various uses dependent upon the material being distributed to control the amount the operator desires to distribute. Moreover, I provide a pair of operating doors either one of which alone may be used, so that if fertilizer is being spread the spinner speed is such that no material is thrown on the tractor or mechanism itself.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure I is a front elevational view, partly in section, showing the assembled distributor;

Figure II is a transverse vertical sectional view;

Figure III is a perspective view of the spinner plate; while

Figure IV is a detail view of the door control mechanism.

The hopper 10 preferably of sheet metal construction, as indicated, so as to be conveniently carried and supported by the hoist arms of a tractor, does not extend sidewise beyond the tractor itself, and consequently will not break off branches of trees, etcetera. The hopper 10 has an inclined bottom portion 11 at each end thereof as indicated at Figure I, and centrally at the lower portion of the hopper, I have located a pair of inclined plates 14 and 15 dividing the lower part of the hopper into two compartments having the discharge openings 16 and 17 as indicated.

Each of the discharge openings of the hopper has a pivoted door 20 and 21 located on the outside of the hopper and suitably hinged to the inclined sections 11, as indicated.

Centrally located and suitably attached to the hopper 10 are a pair of downwardly depending plates 24 and 25 between which is located the spinner 26 having a plurality of lateral vanes 27, said spinner being carried by a central shaft 29 upon which is located a bevelled gear 30. The vertical shaft 29 is mounted in a thrust bearing 32 carried by an angle iron 34 secured to the depending plates 24 and 25, as illustrated in Figure I.

In certain embodiments of my invention, the power for driving the distributing mechanism is derived from the power take off of a farm tractor, and to this end I have illustrated a shaft 38 mounted in bearings 39 and 40 as shown in Figure II, the same being mounted on a plate 41 connected with the bottom of the angled spacer hopper plates 14 and 15. This shaft 38 carries a bevelled gear 43 for driving the vertical shaft 29 of the spinner through the bevelled gear 30. The shaft 38 has a pair of universal joints illustrated diagrammatically at 45 for connection with the power take off of the farm tractor as stated.

Within the hopper is located a suitable agitator 50 comprising a suitably mounted rotatable shaft 51 carrying a large number of agitator rods or pins 52. The shaft 51 has a V-shaped pulley 55 for a drive through belt 56 from a pulley 57 located on the main distributor shaft 38. By deriving its power from the main power take off of a tractor, I have provided a very simple driving mechanism requiring only one set of straight bevelled gears 43 and 30. Moreover, I can drive the agitator 50 from the main distributor shaft 38 by the arrangement indicated. In lieu of the belt drive, I could use a chain and sprocket connection.

An important feature of my invention is a separate control of the amount of opening of the doors 20 and 21 to control the rate of feed and the place of its discharge on the spinner plate. To this end, it will be seen that the door 20 has an inwardly extending anchor 60 to which the control rod 61 is connected by eye 62 permitting necessary movement between the rod 61 and the door 20. The rod 61 extends upwardly through the hopper to adjacent one side thereof as indicated in Figures II and IV where it is screw threaded into the hub of a crank handle 65 by which the operator is enabled to open and close the doors 20 irrespective of possible lumps of material in the hopper due to the amount of pressure which may be readily developed in a screw action of this kind. These levers 65 are within the easy reach of the operator running the tractor.

One satisfactory embodiment of adjustable mechanism for operating the doors from crank lever 65 includes a supporting plate 66 located at the top of the hopper and adjacent one side thereof. I provide a pair of cooperating locking nuts 67, each of which may be adjusted on the screw-threaded portion of the rod 61 to the particular place desired. Then, by turning on the crank handle 65 until the hub thereof contacts the supporting plate 66, it will be seen that the rod 61 is drawn upwardly until the lock nuts 67 contact the underside of the plate 66. This permits the opening of the door to an extent desired depending upon where the cooperating locking nuts 67 are "set" on the rod 61.

It will be understood that by binding the lower locking nut 67 tightly against the underside of the upper nut, these nuts are fixed in position and form an adjustable stop for controlling the extent of the opening of the doors. Thereafter, the operator may turn the handle 65 until he can raise the rod no further and is always sure that the doors will be open by a fixed amount which may be varied as stated.

It is apparent that, within the scope of the invention, modifications and different arrangements may be made other than is herein disclosed, and the present disclosure is illustrative, merely, the invention comprehending all variations thereof.

What I claim is:

In a material distributor adapted to be carried by a tractor, a hopper having a bifurcated lower portion to provide a pair of discharge chutes therefrom; a rotary spinner horizontally arranged below said discharge chutes adapted to be rotated to centrifugally distribute material fed on said spinner; a structural frame rigidly attached to the outer surfaces of said discharge chutes and depending therefrom to a point below said spinner; a centrally located pivot shaft attached to the lower surface of said spinner; a shaft bearing rigidly attached to said structural frame and adapted to receive the pivot shaft on said spinner for rotation therein; a pair of horizontal bearings carried by said structural frame, a shaft mounted for rotation in said bearings; means for driving said shaft from the power take off of said tractor; a bevel gear mounted on said shaft; a mated bevel pinion rigidly attached to the upper surface of said spinner, said bevel gear and pinion adapted to rotatably drive said spinner from said tractor power take off; a material agitator mounted for rotation adjacent the apex of the bifurcation between said hopper chutes; means for driving said agitator from said tractor power take off shaft; and a pair of independently adjustable doors mounted at the lower extremities of said discharge chutes and adapted to feed material therefrom onto the surface of said spinner for distribution thereby.

ROY A. SHAW.

REFERENCES CITED

The following references are of record in the file of this patent:

UNITED STATES PATENTS

| Number | Name | Date |
|---|---|---|
| 1,231,269 | Kindling | June 26, 1917 |
| 1,655,780 | Brininger et al. | Jan. 10, 1928 |
| 1,903,836 | Ray | Apr. 18, 1933 |
| 2,102,619 | Francis | Dec. 21, 1937 |
| 2,244,480 | Arndt | June 3, 1941 |
| 2,256,655 | Stewart | Sept. 23, 1941 |
| 2,293,977 | Hoffstetter | Aug. 25, 1942 |
| 2,340,657 | Goertzen | Feb. 1, 1944 |
| 2,393,849 | Werts | Jan. 29, 1946 |
| 2,463,855 | Crawford | Mar. 8, 1949 |